United States Patent
Baumann et al.

(10) Patent No.: US 6,685,829 B1
(45) Date of Patent: Feb. 3, 2004

(54) FLUID FILTER WITH A DISCHARGE DOME THAT IS FIXED TO THE HOUSING

(75) Inventors: Dieter Baumann, Greven (DE); Wilhelm Ardes, Ascheberg (DE)

(73) Assignee: Ing. Walter Hengst GmbH & Co. KG, Munster (DE)

(*) Notice: Subject to any disclaimer, the term of this patent is extended or adjusted under 35 U.S.C. 154(b) by 175 days.

(21) Appl. No.: 09/889,915

(22) PCT Filed: Sep. 11, 2000

(86) PCT No.: PCT/DE00/03124
§ 371 (c)(1),
(2), (4) Date: Dec. 14, 2001

(87) PCT Pub. No.: WO01/17657
PCT Pub. Date: Mar. 15, 2001

(30) Foreign Application Priority Data

Sep. 9, 1999 (DE) .................................... 299 15 841 U
Oct. 6, 1999 (DE) .................................... 299 17 563 U (51) Int. Cl.⁷ .............. B01D 35/147; B01D 35/153; B01D 35/02; B01D 27/08; B01D 27/10

(52) U.S. Cl. ............. 210/232; 210/248; 210/130; 210/131; 210/440; 210/444

(58) Field of Search ................... 210/232, 131, 210/130, 248, 440, 444

(56) References Cited

U.S. PATENT DOCUMENTS

| | | | | |
|---|---|---|---|---|
| 4,906,365 A | * | 3/1990 | Baumann et al. | 210/238 |
| 5,516,425 A | * | 5/1996 | Brieden et al. | 210/232 |
| 5,770,054 A | * | 6/1998 | Ardes | 210/130 |
| 6,085,915 A | * | 7/2000 | Schwandt et al. | 210/411 |
| 6,569,326 B1 | * | 5/2003 | Baumann et al. | 210/232 |

FOREIGN PATENT DOCUMENTS

| | | |
|---|---|---|
| DE | 3409219 C2 | 9/1985 |
| DE | 3432855 A1 | 3/1986 |
| DE | 8714656 U1 | 2/1988 |
| DE | 4303694 A1 | 8/1994 |
| DE | 9411212 U1 | 10/1994 |
| DE | 19508650 A1 | 9/1995 |
| DE | 29613703 U1 | 11/1995 |
| DE | 29610290 U1 | 10/1996 |
| DE | 19541965 C1 | 2/1997 |
| DE | 19612689 C1 | 6/1997 |
| DE | 19652603 A1 | 6/1998 |
| DE | 19737699 A1 | 3/1999 |
| DE | 29915843 U1 | 3/2001 |
| EP | 0612549 A2 | 8/1994 |
| EP | 0839563 A1 | 5/1998 |
| JP | 09-010515 * | 1/1997 |
| WO | WO 97/00112 A1 | 1/1997 |

* cited by examiner

Primary Examiner—Thomas M. Lithgow
(74) Attorney, Agent, or Firm—Lahive & Cockfield, LLP

(57) ABSTRACT

The invention relates to a fluid filter, such as an oil filter for a combustion engine. The inventive filter comprises an exchangeable filter inset which is provided with a ring-shaped cross-section that encompasses an inner chamber. The outlet for the purified fluid is joined to the inner chamber. The inventive filter also comprises a discharge line for emptying the filter during a filter change. A central discharge dome is provided which extends into the inner chamber. Said dome, together with the filter inset is mounted in such a way as to be axially displaced between a first closing position which closes the discharge line and a second release position which releases the discharge line. According to the invention, the discharge dome is fixed to the housing and is pushed into the release position thereof when said dome is impinged upon with a spring. The dome can be moved into the closing position thereof against the action of the spring and by means of the filter inset which is inserted into the filter housing.

9 Claims, 10 Drawing Sheets

FLUID FILTER WITH A DISCHARGE DOME THAT IS FIXED TO THE HOUSING

RELATED APPLICATIONS

This application claims priority to PCT International Patent Application No. PCT/DE00/03124, filed Sep. 11, 2000, German Patent Application No. DE 299 15 841. 1, filed Sep. 9, 1999, and German Patent Application No. DE 299 17 563.4, filed Oct. 6, 1999 in Germany. This international patent application was published in German. The contents of the aforementioned applications are hereby incorporated by reference.

BACKGROUND OF THE INVENTION

The present invention relates to a fluid filter suitable for use in an internal combustion engine.

This type of filter is known from DE-C2-34,09,219.

DE-U1-296,10,290 discloses a filter with a spring-loaded discharge valve fixed to the housing, which valve is retained in its closed position by the filter insert and which is opened when the filter is opened or the filter insert removed.

DE-U1-04,11,212 discloses a filter in which the discharge opening is closed by a screw.

SUMMARY OF THE INVENTION

An object of the present invention is to provide a generic filter that is as cost-effective and as space-saving as possible.

This object is achieved by a filter having a discharge dome that is fixed to the filter housing.

The invention proposes, in other words, a filter in which the discharge dome is designed not as a component which is part of the removable filter insert but as a component which is fixed to the housing such that the discharge dome always remains on the filter. This approach allows for the space-saving packaging of the actual filter inserts since the top-to-bottom height of the latter is reduced by that dimension which is provided in generic filters as the closure pin which is still connected axially to the actual filter medium. The separate discharge domes themselves have a diameter which is considerably reduced with respect to the filter inserts and may thus be packaged in a considerably more space-saving manner for delivery to the engine manufacturer: either separately from the filter inserts, or if necessary located in the inner chamber of the filter insert, thereby obviating the need for a second, separate package—thereby enabling a shipping process which is overall more space-efficient and material-efficient, and generally more cost-efficient.

This cost advantage is particularly relevant to the supply of replacement parts, first of all again due to the space-and cost-efficient shipping of the filter inserts, and secondly as the material portion of the discharge dome is completely obviated since this component remains fixed to the filter housing—with the result that the cost of replacement parts is reduced twofold.

In the filters according to the species, the discharge line is opened by removing the filter insert since the discharge dome is removed from the filter housing together with the filter insert. In the present invention, exactly the same motion of filter insert and discharge dome is effected in that the spring-loaded discharge dome returns to its release position when the spring is released. This spring is compressed when the filter insert is inserted into the-filter housing, and the cover of the filter housing is closed, the discharge dome being moved into its closed position at the same time.

An additional cost savings during manufacture of a filter according to the invention results from the fact that the discharge dome advantageously is not only designed to function as the discharge closure device but is provided with a second valve function. The latter may, for example, form the conventional filter bypass valve which enables the fluid to bypass the filter medium in the event of excess pressure, or it may constitute an anti-drainback valve which prevents the oil from draining back into the crankcase and thus emptying the filter housing.

Specifically, there may be the simple and component-saving provision of having this additional valve function controlled by the axial adjustability of the discharge dome. In this way, the discharge dome may be fabricated from very few components and the valve functions integral to it realized in a particularly cost-effective manner; and the user, for example in the automobile plant, may save assembly steps of mounting various valves required for the associated valve functions.

An especially cost-effective provision may be made in which the additional valves are not yet functional at the delivery stage of the discharge dome but constitute simply a valve body which forms a functioning valve only when interacting with an additional sealing surface independent of the discharge dome. This approach permits the assembly of the valve body to be effected in an especially simple and cost-effective, i.e. optimally accessible manner.

A support dome within the filter insert may be advantageously provided in the conventional manner such that the removable filter insert may be fabricated using very little material, and its filter medium may attach to the permanently installed support dome remaining in the filter. This support dome may be advantageously designed as an extension or axial continuation of the discharge dome so that as few components as possible need to be fabricated and manipulated, with the resulting positive effect on manufacturing and assembly costs. Specifically, the extension of the discharge dome thus created permits a filter bypass valve to be provided on the side of the valve insert located opposite the discharge opening.

When designing the support dome as an extension of the discharge dome, it may be advantageous in certain cases to design the dome to consist of two sections such that when manufacturing a "product family" of filters, only one uniform base part having the discharge dome is fabricated and parts of various length dependent on the differing top-to-bottom heights of the filter housing and filter inserts are always connected to the same base component so as to ensure the sufficient support function of the dome.

BRIEF DESCRIPTION OF THE DRAWINGS

The following discussion elucidates certain embodiments of the invention based on the drawings provided.

DESCRIPTION OF ILLUSTRATED EMBODIMENT

Figure 1A:
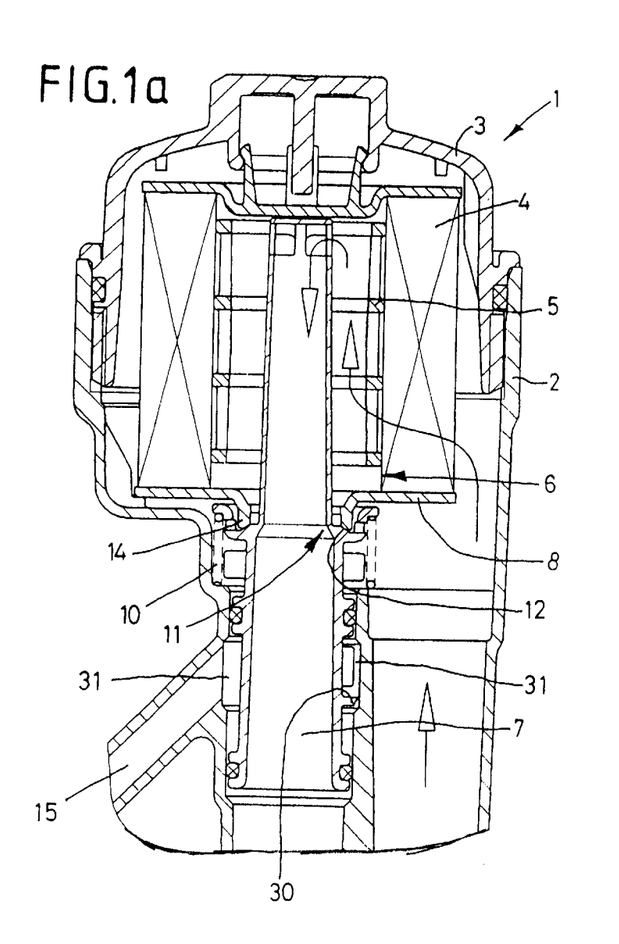
FIGS. 1a–1d show a first embodiment in various states of operation.

Reference 1 in FIG. 1a shows a generalized filter which is constituted as an oil filter for an internal combustion engine. Filter 1 has a filter housing 2 designated as the base as well as a cover 3, a removable filter insert 4 being secured by clipping at its top end disk to cover 3.

FIG. 1a shows the operating state of filter 1 with the engine running: The rows indicate that the oil to be filtered first rises from the bottom through an inlet, then ows through the filter medium of filter insert 4, is then directed upward within a support dome 5, and finally enters through the openings of support dome 5 into an inner amber 6 of filter insert 4 and then flows downward to a central outlet 7.

Figure 1B:
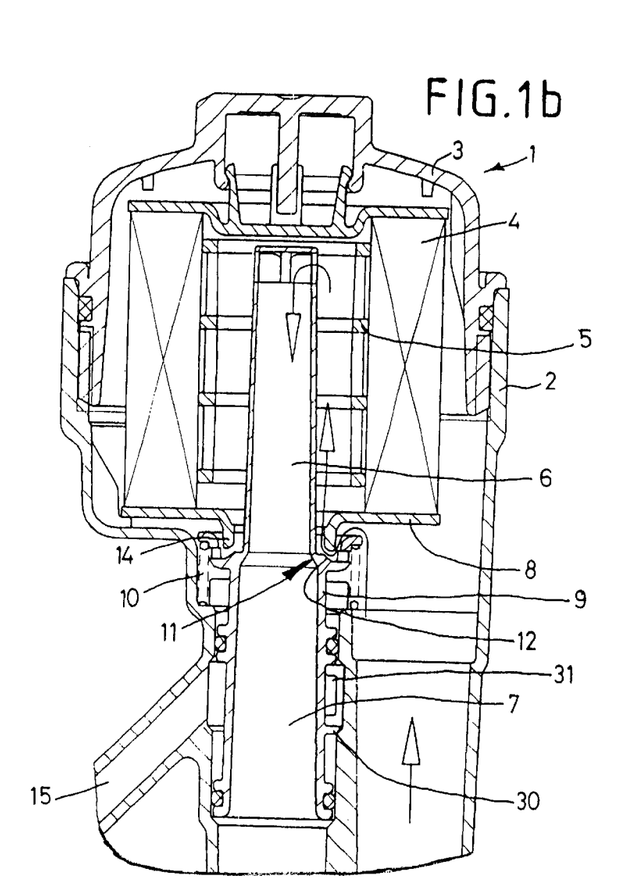

By contrast, FIG. 1b shows an operational state of filter 1 in which a filter pass valve 11 is open so that the filter medium of the filter insert is bypassed:

Between a lower end disk 8 of filter insert 4 and a discharge dome 9, a gap has opened because the excess pressure of the inflowing oil has reached a certain value due, for example, to the excess viscosity of the oil at low temperatures or to filter insert 4 being essentially blocked. Discharge dome 9 has been pressed downward by this pressure against the action of a spring 10, thereby opening up the above-mentioned gap. Filter bypass valve 11 is thus formed by a sealing surface 12 of discharge dome 9 and a collar 14 which is molded onto lower end disk 8 of filter insert 4. The oil thus passes unfiltered into inner chamber 6 and then into support dome 5 and outlet 7. Discharge dome 9 is made of plastic. It has a plurality of retaining fingers 30 projecting radially outward which have both an elastic spring-like characteristic and are also attached splayed inward at their lower exterior face. Discharge dome 9 may thus be inserted into a sleeve provided at the filter base which forms the wall of outlet 7 until the retaining fingers are released in an undercut 31 of this sleeve such that discharge dome 9 is fixed within the sleeve yet movable vertically within undercut 31.

Figure 1C:
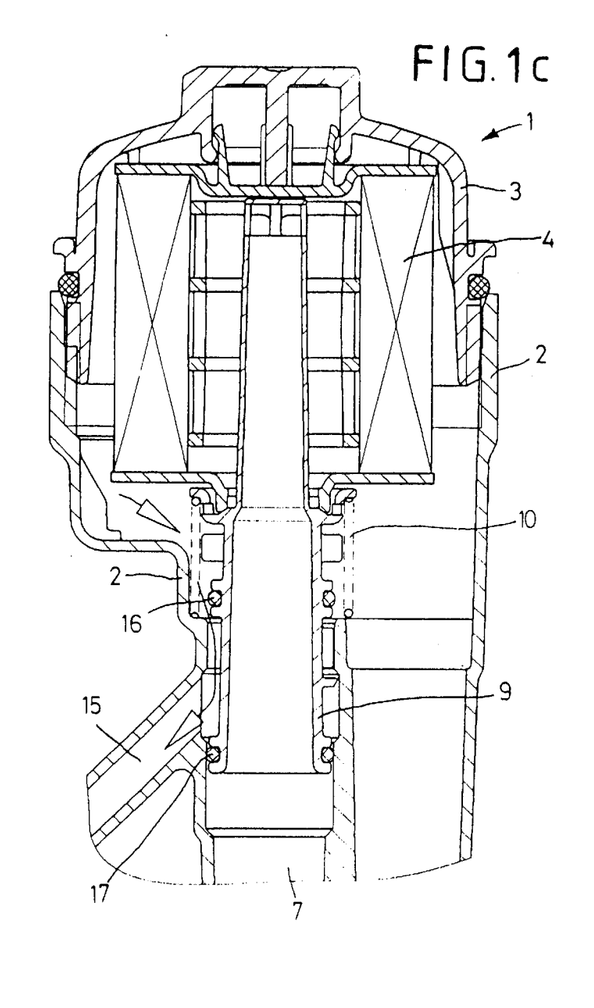

FIG. 1c shows an operational state for filter 1 during a so-called "filter change" in which in fact only filter insert 4 is changed: Cover 3 has already been partially unscrewed from filter housing 2. Due to the action of the clip connection, filter insert 4 has been lifted with respect to the operating position of FIG. 1 a so that spring 10 has been released. The oil located in filter housing 2 may now flow radially outside discharge dome 9 into a discharge line 15 since discharge dome 9 has been lifted to the extent that discharge seal 16 no longer contacts filter housing 2 to form a seal. A bypass seal 17, however, is located below discharge line 15, still forming a seal with filter housing 2 so that unfiltered oil remaining in the filter housing cannot pass into outlet 7 and thus to the lubricating points of the engine.

The function of the undercut 31 is, in addition to accommodating retaining fingers 30, to avoid a sharp edge at the point where discharge line 15 enters the opening of outlet 7 and where otherwise discharge seal 17 could be damaged during the mounting of discharge dome 9 when the latter is moved axially and inserted into filter housing 2.

Figure 1D:
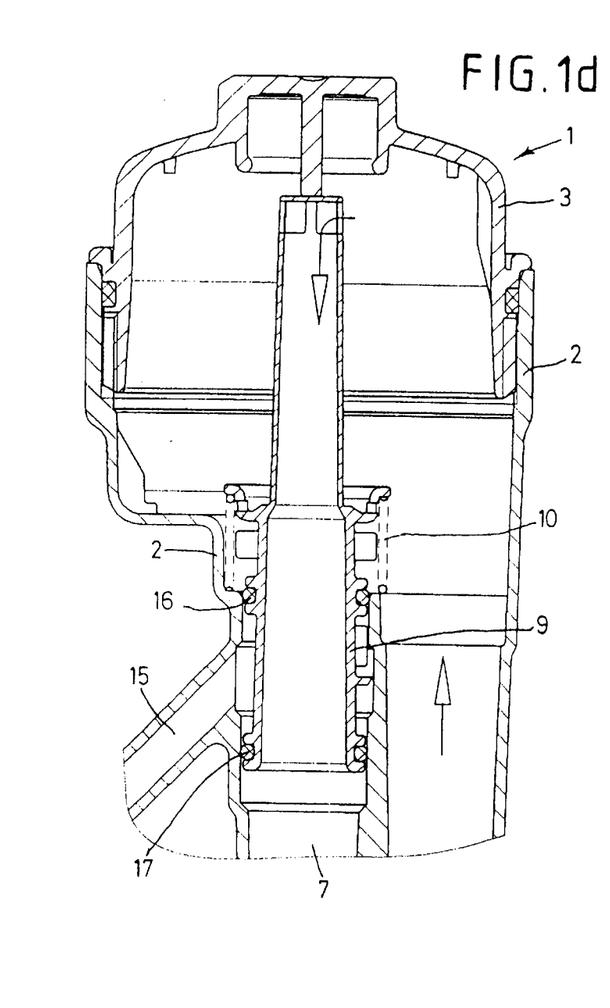

FIG. 1d shows an unintended operational state of filter 1 in which the filter is used without a filter insert. In the this event, the filter nevertheless ensures as much as possible the proper functioning of the engine: By axially extending discharge dome 9 to the point where it contacts a central pin or bridge of cover 3, the discharge dome is pressed downward a small distance such that discharge seal 16 contacts filter housing 2 to form a seal, thereby preventing the oil from entering discharge line 15. Instead the oil is directed through the openings provided for the filtered oil in the upper section of discharge dome 9 and from there to outlet 7.

Figure 2A:
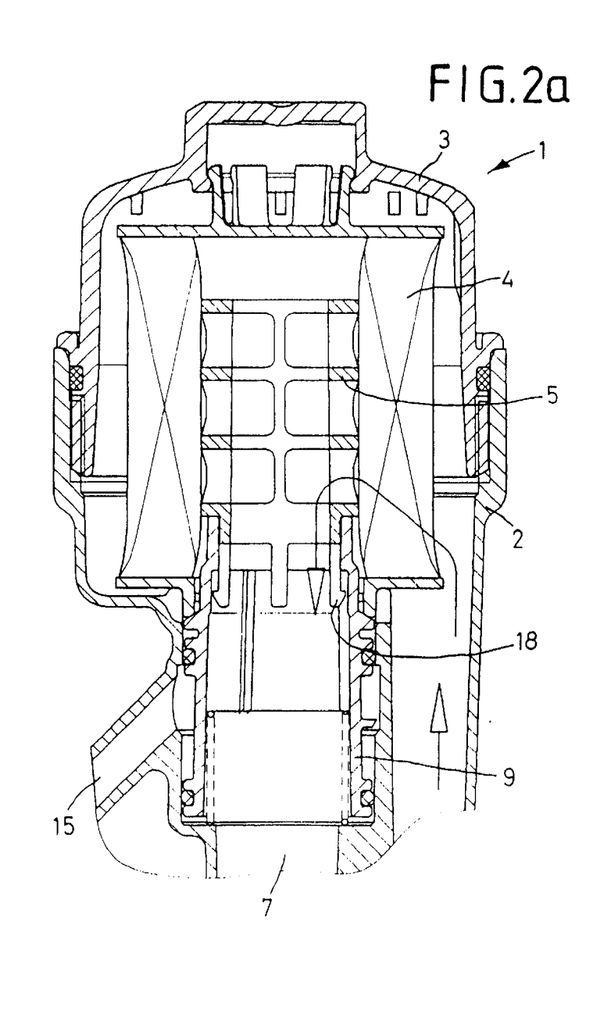
FIGS. 2a, 2b, 3a, 3b show two further embodiments in various states of operation.
Figure 2B:
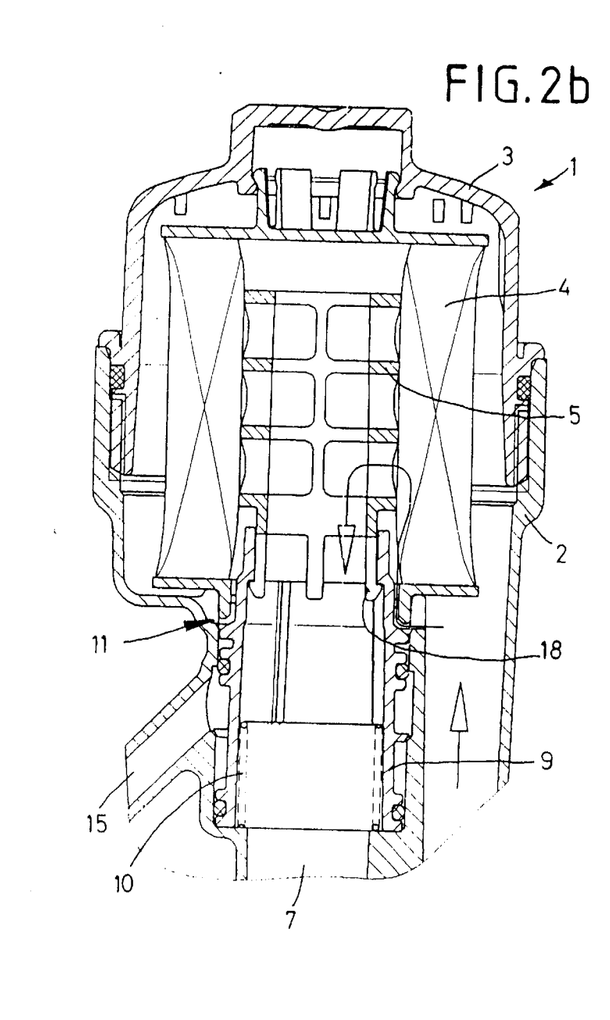

FIGS. 2a and 2b show a second embodiment in which filter insert 4 has no separate support dome. In the operational state, given prevailing conditions of pressure and temperature and fluid impingement by the oil, the filter medium of filter insert 4 softens and attaches securely to the provided support dome 5 which is connected via spring-elastic claws 18 to discharge dome 9. FIG. 2a shows the operational state of filter 1 with the engine running in which the unfiltered oil passes through filter insert 4 and then through openings in support dome 5 to outlet 7.

By comparison, FIG. 2b shows the operational state with filter bypass valve 11 open: Here again discharge dome 9 is lowered by the prevailing excess pressure in filter housing 2 such that the oil rises between the folds of filter insert 4 and flows through support dome 5 into outlet 7 without having to pass through the filter medium of filter insert 4. In this embodiment too, spring 10 is provided which presses discharge dome 9 upward.

Figure 3A:
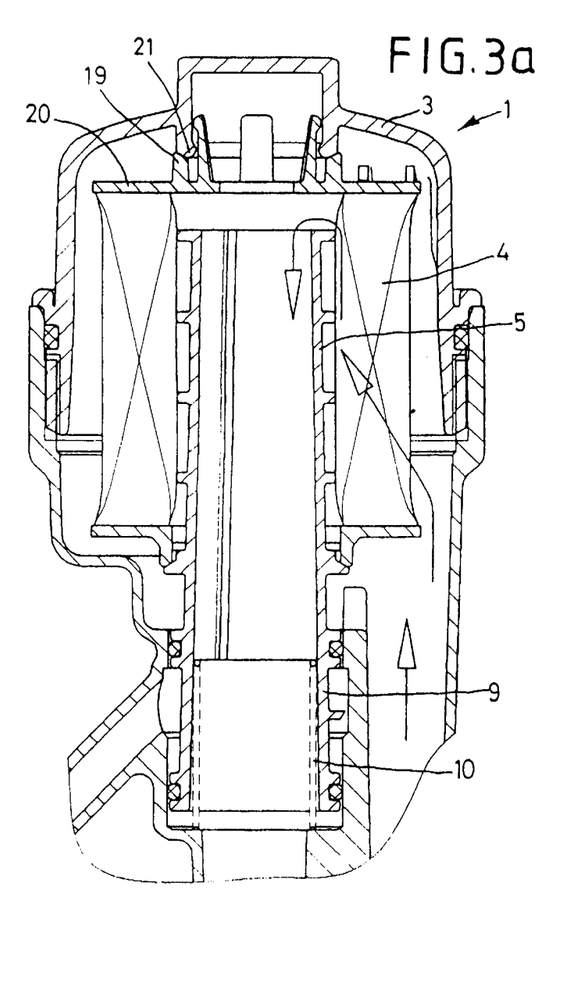
Figure 3B:
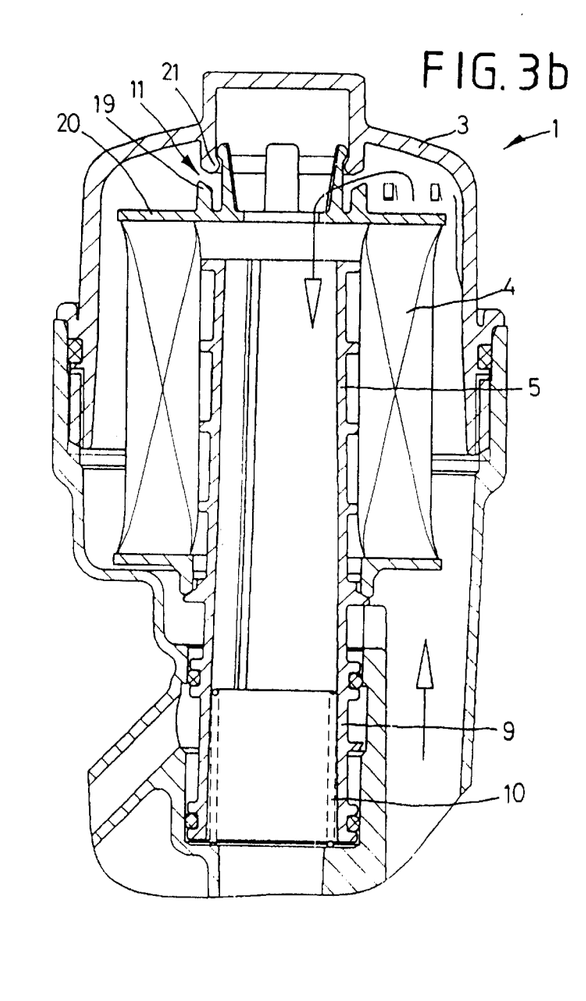

FIGS. 3a and 3b show a third embodiment; FIG. 3a showing the operational state of filter 1 with the engine running. By contrast, FIG. 3b shows filter bypass valve 11 which is formed by a collar 19 at an upper end disk 20 of filter insert 4 and a sealing surface 21 of cover 3. Given excess pressure in filter 1, filter insert 4 is pressed downward, thus opening filter bypass valve 11. This motion forces discharge dome 9, which as a single piece also forms support dome 5, downward against the action of spring 10.

The continual motions of discharge dome 9, as provided in the embodiments of FIGS. 1–3 to trigger the opening of filter bypass valve 11 as is commonly the case during cold starts of the engine, require highly wear-resistant seals since discharge dome 9 is designed as a permanent component of filter 1.

Figure 4:
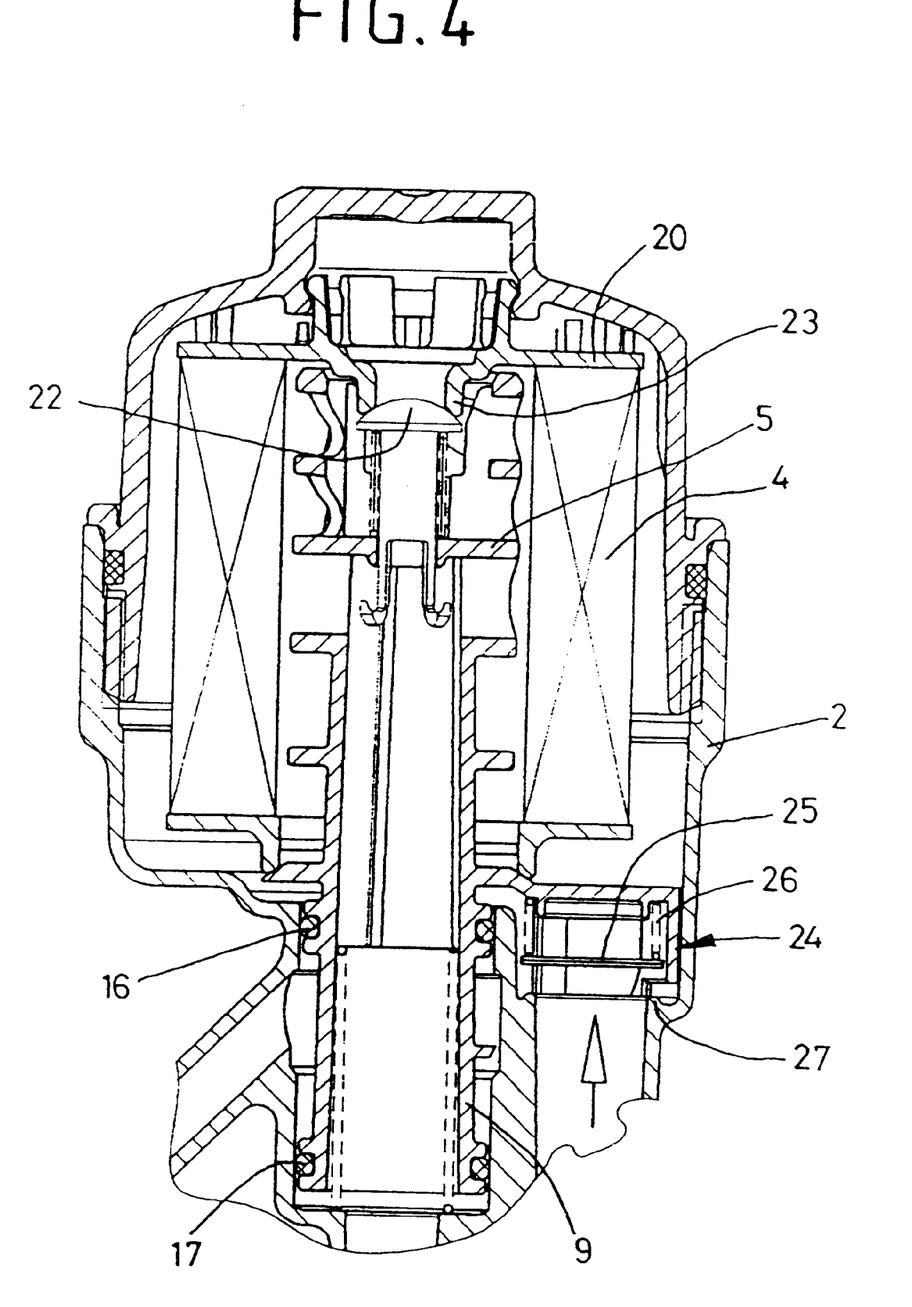
FIGS. 4 through 9 each shows additional embodiments.

By comparison, FIG. 4 shows a further embodiment of the invention which can be designed to use more cost-effective seals, for example commercially available O-rings. Here the function of filter bypass valve 11 is realized, just as in the following examples FIGS. 5 through 7, by a conventional valve body 22 which is provided in the upper section of support dome 5. Facilitating the fabrication of this filter bypass valve 11 is the fact that filter body 22 may be installed very simply and quickly as it is optimally accessible since it interacts with a sealing surface 23 acting as a valve seat which is formed in the conventional manner by a separate component, i.e. upper end disk 20 of filter insert 4, such that a functional valve is created only during final assembly of entire filter 1 rather than earlier during pre-assembly of the individual subassemblies.

Discharge dome 9 of the embodiment in FIG. 4 has an anti-drainback valve 24 which in turn has a valve flap 25 shown schematically which is opened by the oil flowing in from below acting against a spring 26 and which in its closed position prevents the return flow of oil from the inner chamber of filter housing 2 when the engine is off. FIG. 4 shows the operational state of filter 1 with the engine running, in which state valve flap 25 is open.

Also simplified and more cost-effective is the assembly of anti-drainback valve 24 due to the fact that this valve too interacts with a sealing surface 27 which is independent of closure dome 9 such that optimal reachability and accessibility of valve flap 25 and spring 26 are ensured during assembly, and the functionality of anti-drainback valve 24 is achieved only when discharge dome 9 is installed into filter housing 2 by attaching valve flap 25 to sealing surface 27 provided on the housing side.

In this embodiment of FIG. 4, the functions of the discharge dome are realized with high integration density, these functions being that of the discharge valve and that of the filter bypass valve as well as that of the anti-drainback valve so that an especially simple and quick assembly is ensured, for example for an engine manufacturer or automobile plant, by the use of a highly complex component delivered in prefabricated form. Here, the fact that this embodiment with separate valve body 22 does not require discharge dome 9 constantly to move back and forth to create the function of a filter bypass valve permits the use of the comparatively inexpensive seal in the area of discharge seal 16 and bypass seal 17.

Figure 5:
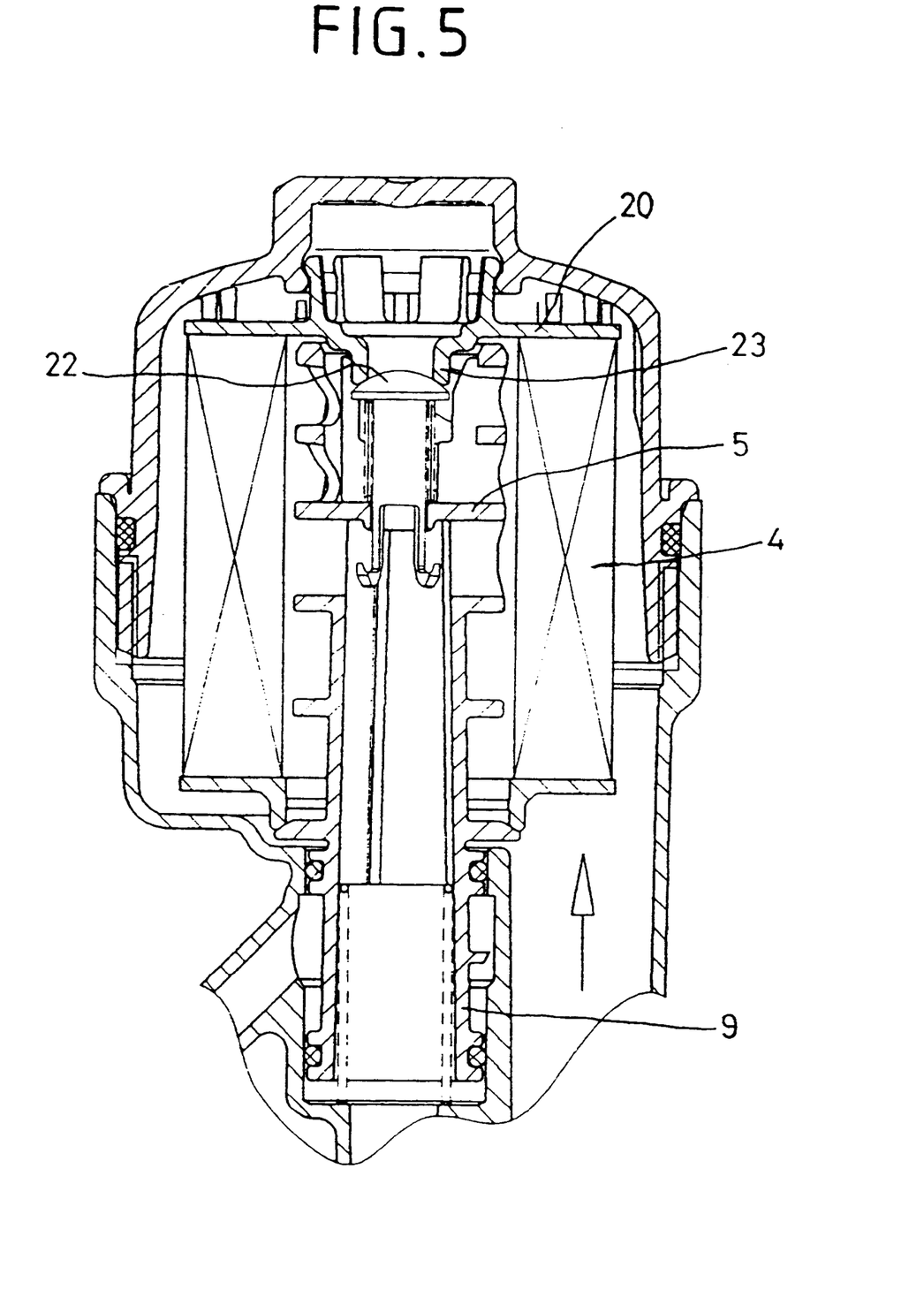

FIG. 5 shows a similar embodiment with a comparatively even more cost-effective discharge dome 9 without the anti-drainback valve.

Figure 6:
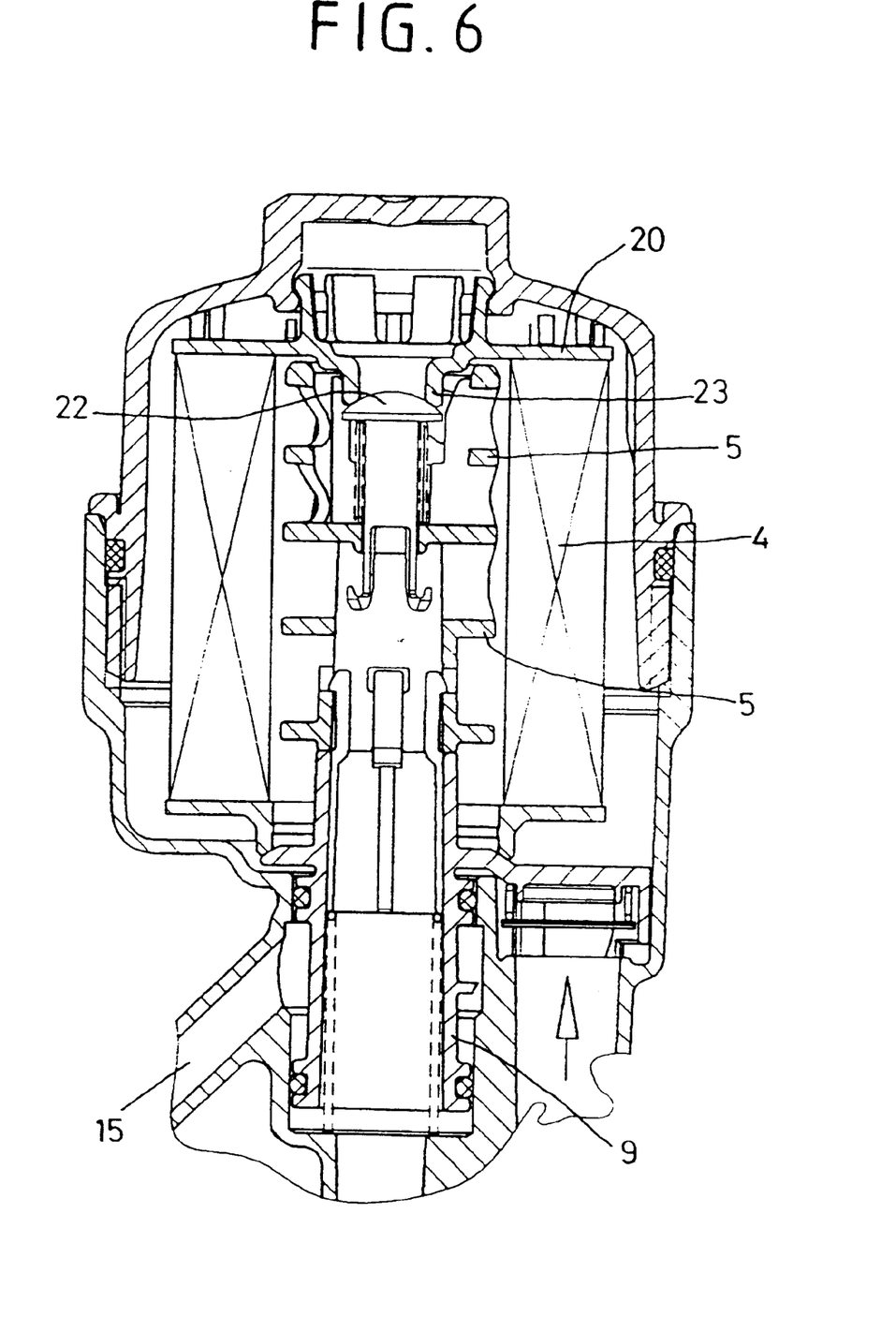
Figure 7:
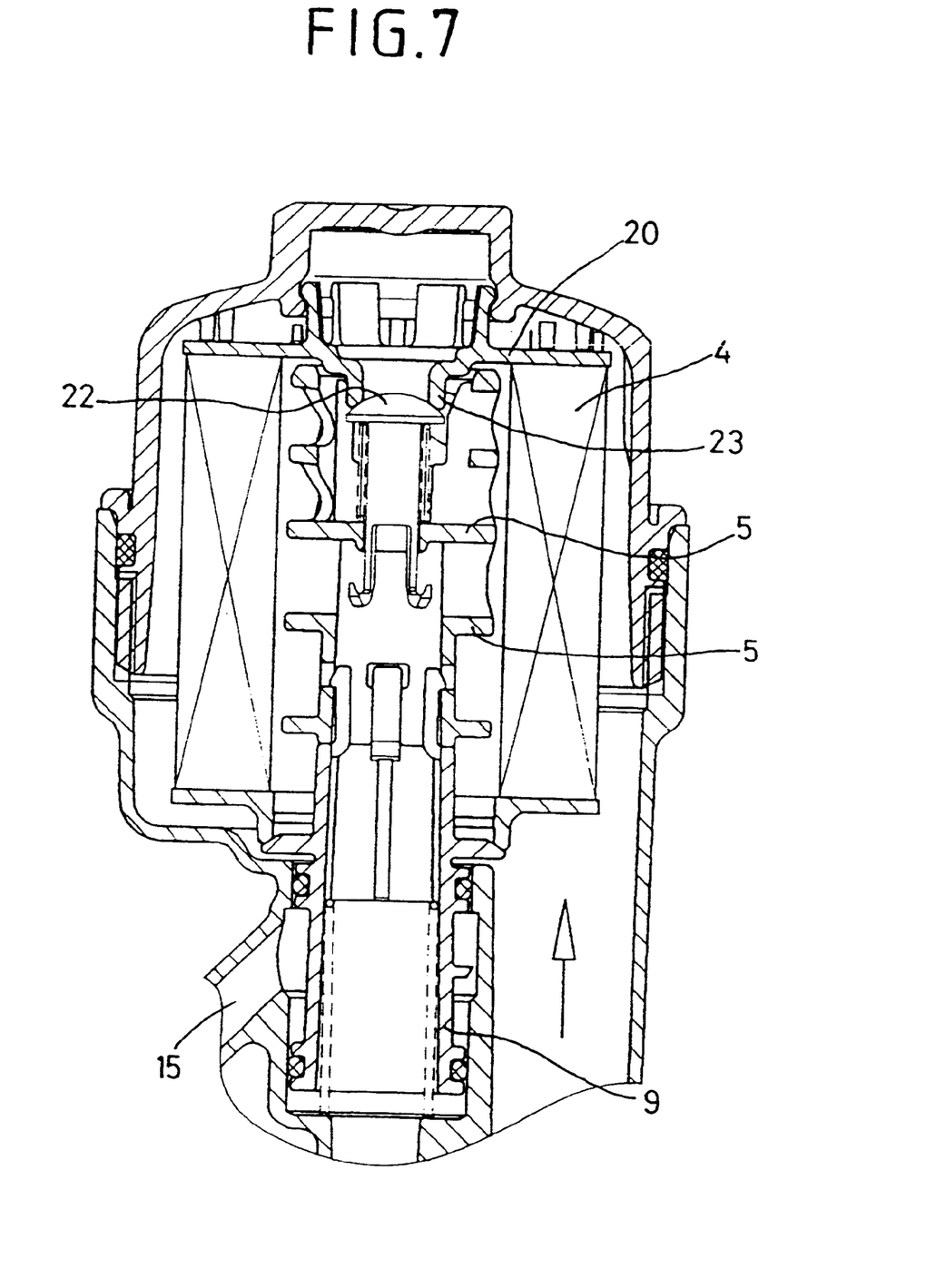

The embodiment of FIG. 6 corresponds essentially to those of FIG. 4, and that of FIG. 7 essentially to that of FIG. 5, with the difference, however, that discharge dome 9 has a two-part design.

This two-part discharge dome 9 may be utilized for essentially similar filters which may entail different filter sizes adapted to different engine types, and which have filter inserts of different top-to-bottom height. Conforming to the specific top-to-bottom height, the upper section forming support dome 5 may be designed so that different discharge domes 9 of different overall lengths may be fabricated by simple means and at low cost in tools.

Figure 8:
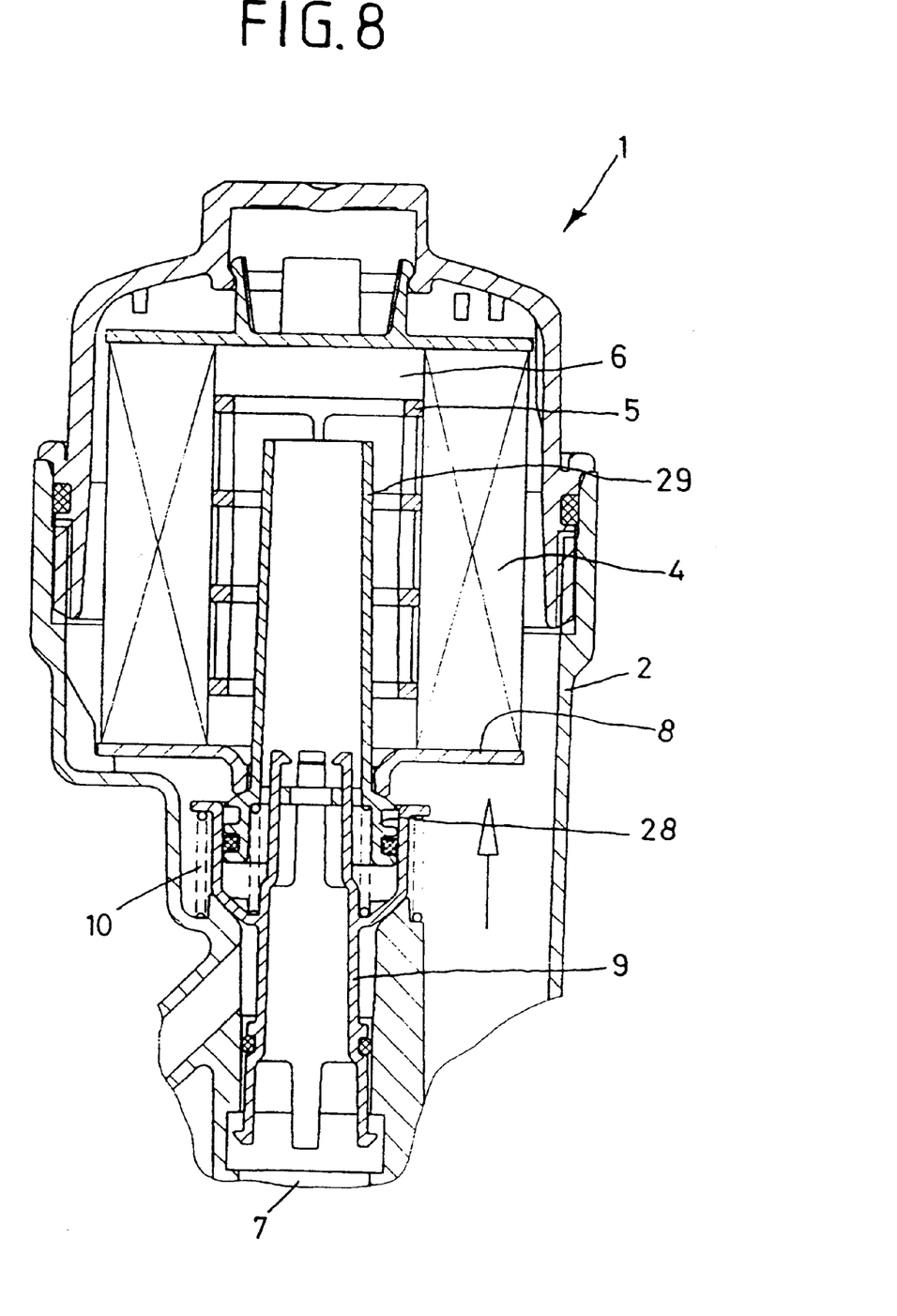

Finally, FIG. 8 shows an embodiment in which the function of the filter bypass valve is realized not by discharge dome 9 itself by a separate valve body 28. In response to excess pressure within filter housing 2, valve body 28 is pressed downward so that it moves away from lower end disk 8 and unfiltered oil passes into inner chamber 6, and from there flows to outlet 7.

Valve body 28 is extended at the top and there forms a separation tube 29 in a manner which is similar to that evident in the embodiment of FIG. 1. With the engine off, separation tube 29 prevents all of the oil in filter housing 2, especially in inner chamber 6, from flowing into outlet 7—thus ensuring that a certain minimum quantity of oil remains in the filter.

The embodiments presented thus far relate to filter types in which the discharge is located decentrally, i.e. runs radially outside the outlet, for example parallel to the axis or obliquely as with discharge lines 15 shown. On the other hand, other filters are known with a so-called central discharge which are intended for specific installation conditions. Here the oil first flows through a separate flow channel provided inside the outlet opening, which channel, for example, runs coaxially, separated by a partition wall, around the actual outlet channel and finally branches off. These type of filtersmay also be advantageously designed according to the invention with a central outlet.

Figure 9:
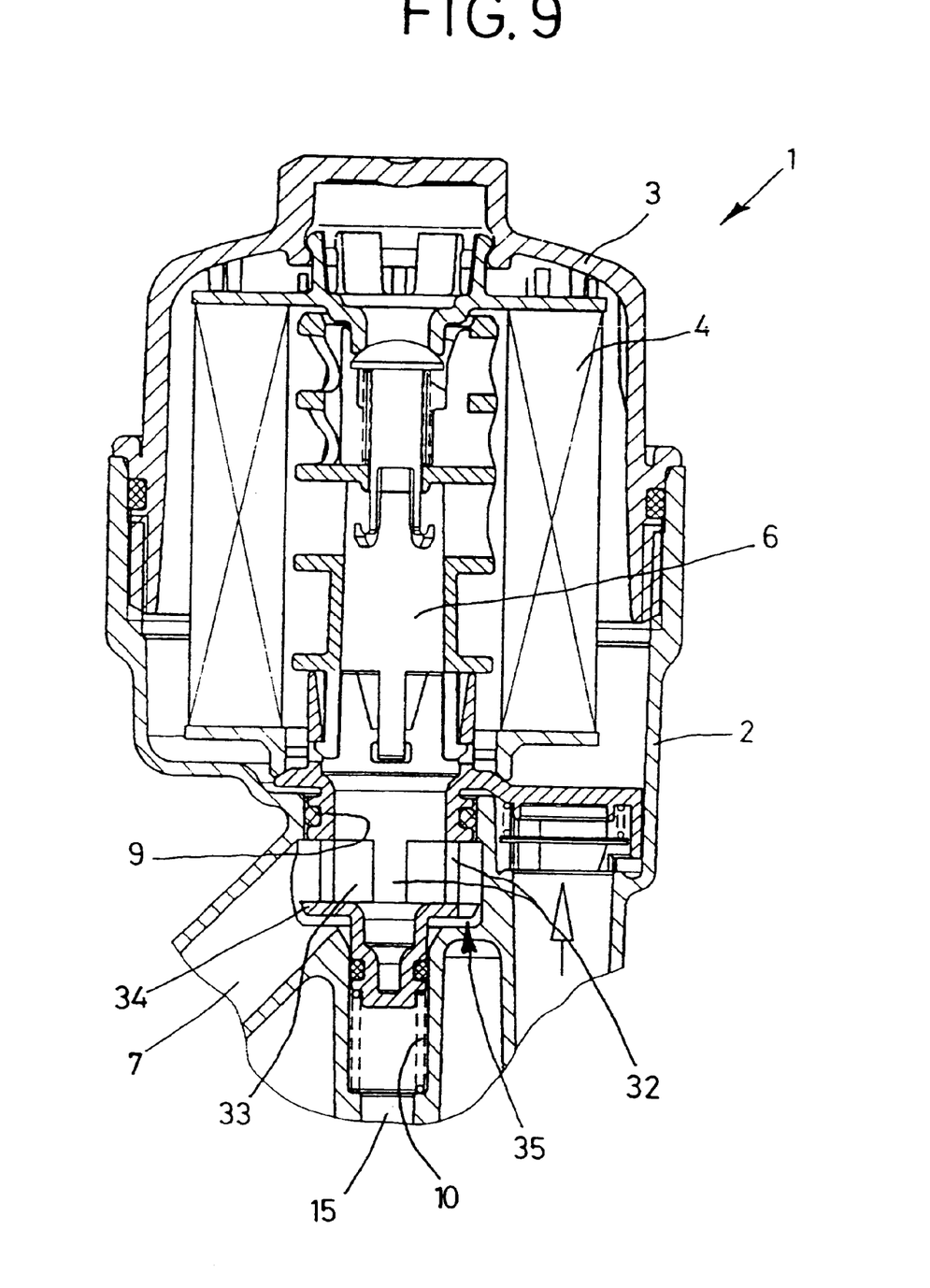

The embodiment of FIG. 9 shows such a filter 1 having central discharge line 15. Discharge dome 9 has a plurality of windows 33 separated by bridges 32 through which the filtered oil passes to outlet 7. The lower end of discharge dome 9 is closed.

During a filter change, i.e. when filter insert 4 is changed, cover 3 is lifted. Spring 10 then releases and raises discharge dome 9 to a position in which the lower end of discharge dome 9 is lifted to the point where it no longer closes off and seals discharge line 15. A surrounding collar 35 consists of a plurality of engagement hooks 34 retaining discharge dome 9 within filter housing 2 so that oil may drain out through the recesses between engagement hooks 34 from inner chamber 6 laterally past the lower end of discharge dome 9 to discharge line 15.

What is claimed is:

1. A fluid filter, comprising
   a replaceable filter insert having an annular cross-section surrounding an inner chamber, an outlet for a filtered fluid connecting to the inner chamber, and a discharge line for draining the filter during a filter change, and
   a central discharge dome extending into the inner chamber, the discharge dome being supported together with the filter insert and being axially movable between a first closed position closing the discharge line and a second release position opening the discharge line,
   wherein the discharge dome is fixed to a filter housing and is urged into the release position by a spring, and is movable by the spring into the closed position by the insertion of the filter insert into the filter housing, and
   wherein the discharge dome forms a filter bypass valve or is connected to a filter bypass valve.

2. The filter according to claim 1, wherein the outlet is connected laterally to the discharge dome and axially to the discharge line.

3. The filter according to claim 1, wherein the discharge dome forms an anti-drainback valve or is connected to an anti-drainback valve.

4. The filter according to claim 1, wherein the valve is movable between an open and a closed state by the position of the axially movable discharge dome.

5. The filter according to claim 1, wherein the valve has a valve body adapted to interact with a sealing surface provided separately from the discharge dome.

6. The filter according to claim 1, wherein the discharge dome extends into the inner chamber forming a support dome for the filter insert.

7. The filter according to claim 6, wherein the discharge dome comprises two sections arranged sequentially along the axial direction of the discharge dome.

8. The filter according to claim 1, wherein the filter insert does not require a separate sealing component but instead connects directly to the discharge dome.

9. The filter according to claim 1, further comprising a separation tube disposed in the inner chamber and having an upper inlet opening for filtered fluid and a lower outlet opening connecting to the outlet, the separation tube being adapted for connecting tightly to the wall of the outlet, forming a fluid-tight seal and preventing the inflow of filtered or unfiltered fluid.

\* \* \* \* \*